United States Patent
Lupo (10) Patent No.: US 11,056,891 B2
(45) Date of Patent: Jul. 6, 2021

(54) BATTERY STACK MONITORING AND BALANCING CIRCUIT

(71) Applicant: NXP USA, Inc., Austin, TX (US)

(72) Inventor: Savino Luigi Lupo, Munich (DE)

(73) Assignee: NXP USA, Inc., Austin, TX (US)

( * ) Notice: Subject to any disclaimer, the term of this patent is extended or adjusted under 35 U.S.C. 154(b) by 124 days.

(21) Appl. No.: 16/039,081

(22) Filed: Jul. 18, 2018

(65) Prior Publication Data

US 2020/0028369 A1    Jan. 23, 2020

(51) Int. Cl.
*H02J 7/00* (2006.01)
*H01M 10/0525* (2010.01)
*H01M 50/543* (2021.01)

(52) U.S. Cl.
CPC ....... *H02J 7/0019* (2013.01); *H01M 10/0525* (2013.01); *H01M 50/543* (2021.01); *H02J 7/0021* (2013.01); *H02J 7/00302* (2020.01)

(58) Field of Classification Search
CPC .... H02J 7/0019; H02J 7/0021; H02J 7/00302; H02J 7/0016; H01M 2/30; H01M 10/0525; G01R 31/382
USPC .......................................................... 429/61
See application file for complete search history.

(56) References Cited

U.S. PATENT DOCUMENTS

| | | | |
|---|---|---|---|
| 9,194,904 B2 | 11/2015 | Wang et al. | |
| 10,649,040 B2 | 5/2020 | Ollitrault et al. | |
| 2010/0259276 A1 | 10/2010 | Streit | |
| 2012/0025835 A1 | 2/2012 | Chandler et al. | |
| 2013/0026994 A1 | 1/2013 | Morikawa | |
| 2013/0242446 A1* | 9/2013 | Oshima | H01M 10/482 361/86 |
| 2013/0300371 A1 | 11/2013 | Bills | |
| 2015/0346257 A1 | 12/2015 | Tabatowski-Bush | |
| 2016/0089999 A1 | 3/2016 | Tabatowski-Bush | |
| 2018/0024198 A1* | 1/2018 | Izawa | G01R 31/3648 320/132 |
| 2018/0149689 A1* | 5/2018 | Ollitrault | G01R 31/3008 |

FOREIGN PATENT DOCUMENTS

DE    102015219828 A1    4/2017

* cited by examiner

Primary Examiner — Gary D Harris (57) ABSTRACT

A method and apparatus for battery stack monitoring and balancing. In one embodiment the apparatus includes a first low-pass filter (LPF) coupled between a first terminal and a first input node of a circuit that comprises a plurality of input nodes, wherein the first terminal is configured to be coupled to a positive terminal of a battery cell. A second LPF is coupled between the first terminal and a second input node of the circuit. A first circuit is coupled between the first terminal and a second terminal, wherein the first circuit is configured to transmit current between the first and second terminals when activated, and wherein the second terminal is configured to be coupled to a negative terminal of the battery cell. A second circuit is coupled between the second and third input nodes, wherein the second circuit is configured to activate the first circuit in response to the second circuit receiving a control signal.

9 Claims, 4 Drawing Sheets

BATTERY STACK MONITORING AND BALANCING CIRCUIT

BACKGROUND OF THE INVENTION

A battery pack contains one or more individual battery cells. The cells may be connected together in series, in parallel or in a mixture of both to deliver the desired voltage, capacity, or power density. The present technology will be described with reference to a battery pack with a set of cells arranged in series (i.e. stacked) it being understood the present technology should not be limited thereto.

A rechargeable battery cell is a type of cell that can be charged, discharged, and recharged many times. Rechargeable battery cells may take form in different combinations of electrode materials and electrolytes, including lead-acid, nickel-cadmium, nickel-metal hydride, lithium-ion, etc. Lithium-ion is often the chemistry of choice for rechargeable batteries because of its high capacity-to-size ratio and low self-discharge characteristics. While rechargeable cells come in many different configurations, the present technology will be described with reference to lithium-ion battery cells, it being understood the present technology should not be limited thereto.

If overheated or overcharged, lithium-ion battery cells may suffer thermal runaway or cell rupture. In extreme cases this can lead to explosion or fire. Over-discharge is another problem. A lithium-ion battery cell may breakdown and permanently fail if it is overly discharged.

Battery management systems (BMS) are provided in lithium-ion battery packs. BMS monitor battery cells and take corrective action if one or more of them are found to be operating in an unsafe condition (e.g., over charged, over heated, over-discharged, etc.).

BRIEF DESCRIPTION OF THE DRAWINGS

The present technology may be better understood, and its numerous objects, features, and advantages made apparent to those skilled in the art by referencing the accompanying drawings.

The use of the same reference symbols in different drawings indicates similar or identical items unless otherwise noted. The Figures are not necessarily drawn to scale.

DETAILED DESCRIPTION

A BMS is an electronic system that manages one or more battery cells in a battery pack. The BMS performs many management functions. For example the BMS monitors battery cells for safe operation. If the BMS determines one or more battery cells are operating outside a safe operating range, the BMS takes corrective action. For example the BMS can monitor the voltage across each battery cell by comparing it to a minimum allowable voltage and a maximum allowable voltage. Cell voltage relates to cell charge. If the cell voltage falls below the minimal allowable voltage (e.g., 2.5 V), the cell might be discharged to deeply, and the BMS should respond by opening contactors to prevent further discharge and irreversible damage to the cell. If the battery cell voltage exceeds the maximum allowable voltage (e.g., 4.3 V), the cell might be over charged, and the BMS should respond by opening contactors to prevent further charging and fire. The BMS can perform additional functions such as cell balancing. Typically cells in a pack will have different capacities to store charge. Without balancing, the smallest capacity cell can be a problem. It can be easily overcharged or over-discharged while other cells with higher capacities are only partially charged. Passive balancing allows a stack to look like every cell has the same capacity as the weakest cell. Using a relatively low current, passive balancing drains a small amount of energy from highly charged cells during the charging cycle so that all cells charge to their maximum capacity. This is accomplished by using a switch and balancing resistor in parallel with each battery cell. Other BMS management functions are contemplated. For the purposes of explanation, the present technology will be described with reference to a BMS performing management functions during operation of a battery pack (i.e., as battery cells are being charged or discharged).

Figure 1:
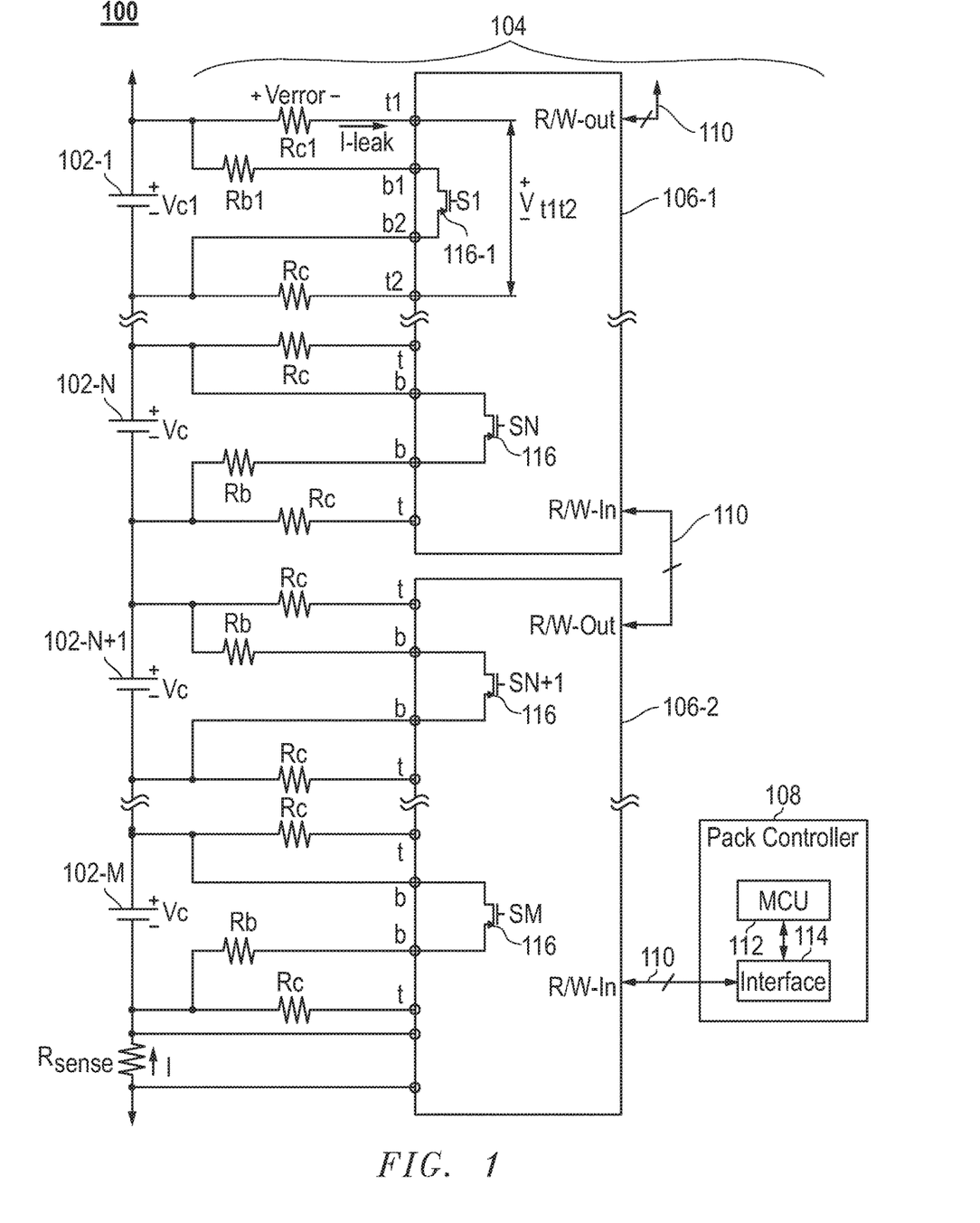
FIG. 1 is a diagram illustrating a battery pack.
Figure 2:
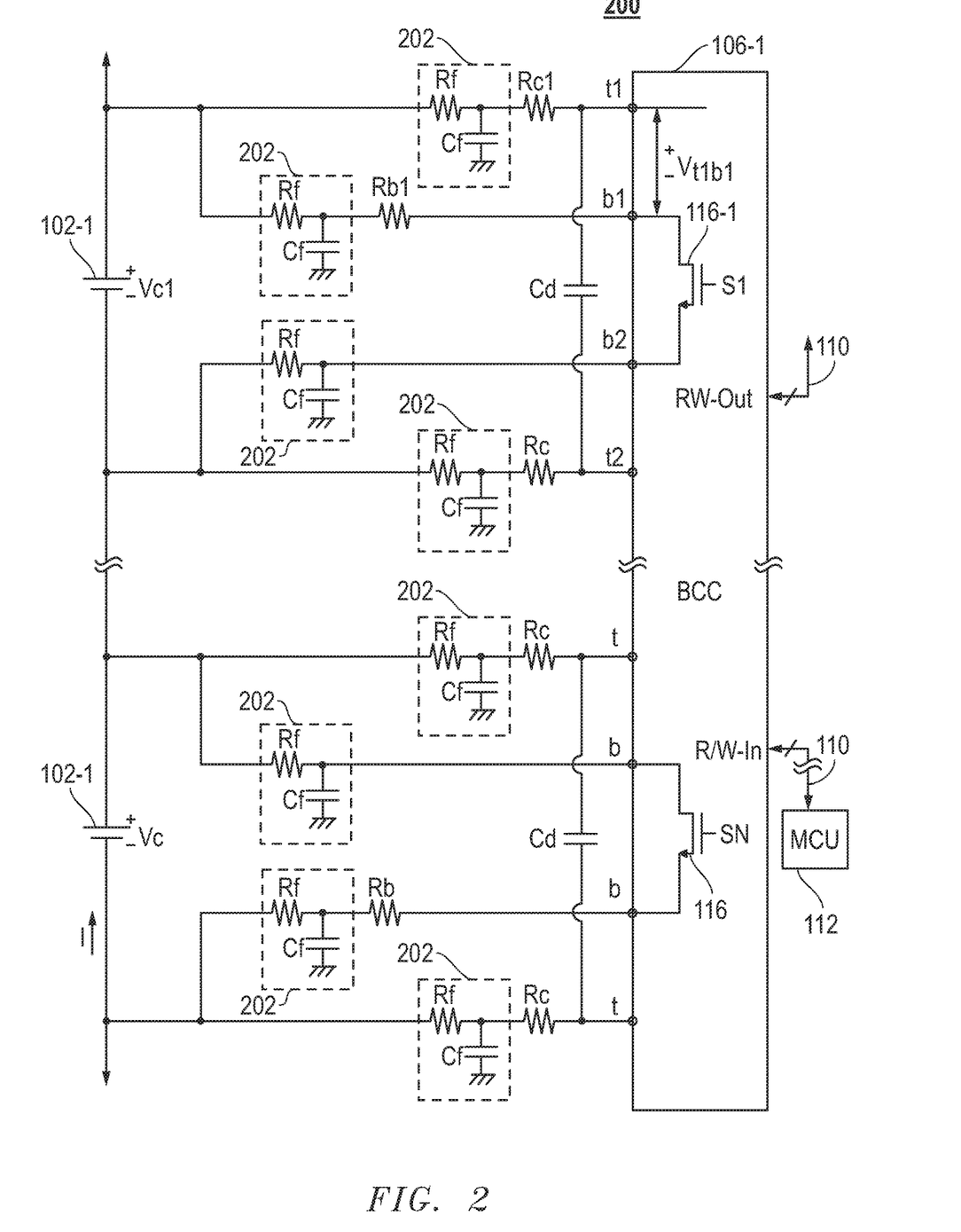
FIG. 2 is diagram of the battery pack shown in FIG. 1 with low-pass filters added thereto.

FIG. 1 illustrates relevant components of a rudimentary battery pack 100, which includes battery cells 102 and a BMS 104. Battery cells 102 are stacked or connected together in series and provide current I to a load device (e.g., a DC-AC inverter of a battery electric vehicle). FIGS. 1 and 2 are provided only to explain potential problems with battery management systems.

BMS 104 includes battery cell monitoring and balancing circuits (BCC) 106, and pack controller 108, which in turn includes microcontroller unit (MCU) 112 or another type of data processing device. BCCs 106 are daisy chained together via their read/write (R/W) communication interfaces and communication bus 110. For purposes of explanation only, just two BCCs 106 are shown.

Data representing variables (e.g., battery cell voltages Vc, current I, temperature, etc.) is requested by MCU 112, which is the master of the communication bus 110, from slaves BCC 106, which answer by returning the requested data. MCU 112 manages cells 102 based on data returned by BCCs 106. If MCU 112 determines one or more cells 102 are operating outside a safe operating range, MCU 112 takes corrective action. For example MCU 112 may open battery contactors (not shown) to essentially disable the stack in response to determining one of cells 102 is overcharged or over-discharged. MCU 112 may also manage passive balancing of cells 102 based on cell voltages provided by BCCs 106. Typically, MCU 112 controls the balancing process during a recharging cycle in order to maintain equality among all cell voltages and to insure that none exceed a maximum allowable voltage.

Each BCC 106 includes cell terminal nodes t and cell balance nodes b. Each terminal node t is coupled to a respective positive or negative terminal of a battery cell 102 via cell resistor Rc. BCCs 106 can indirectly measure cell voltages Vc by measuring differential voltages Vtt at adjacent terminal nodes t. For example, BCC 106-1 can measure voltage $Vc_1$ of battery cell 102-1 by measuring the differential voltage Vt1*t*2 at adjacent input terminal nodes t1 and t2. As will be more fully described below, if no leakage current flows through cell resistor Rc (e.g., Rc1), cell voltage Vc (e.g., $Vc_1$) should equal differential voltage Vtt (e.g., Vt1*t*2).

Figure 4:
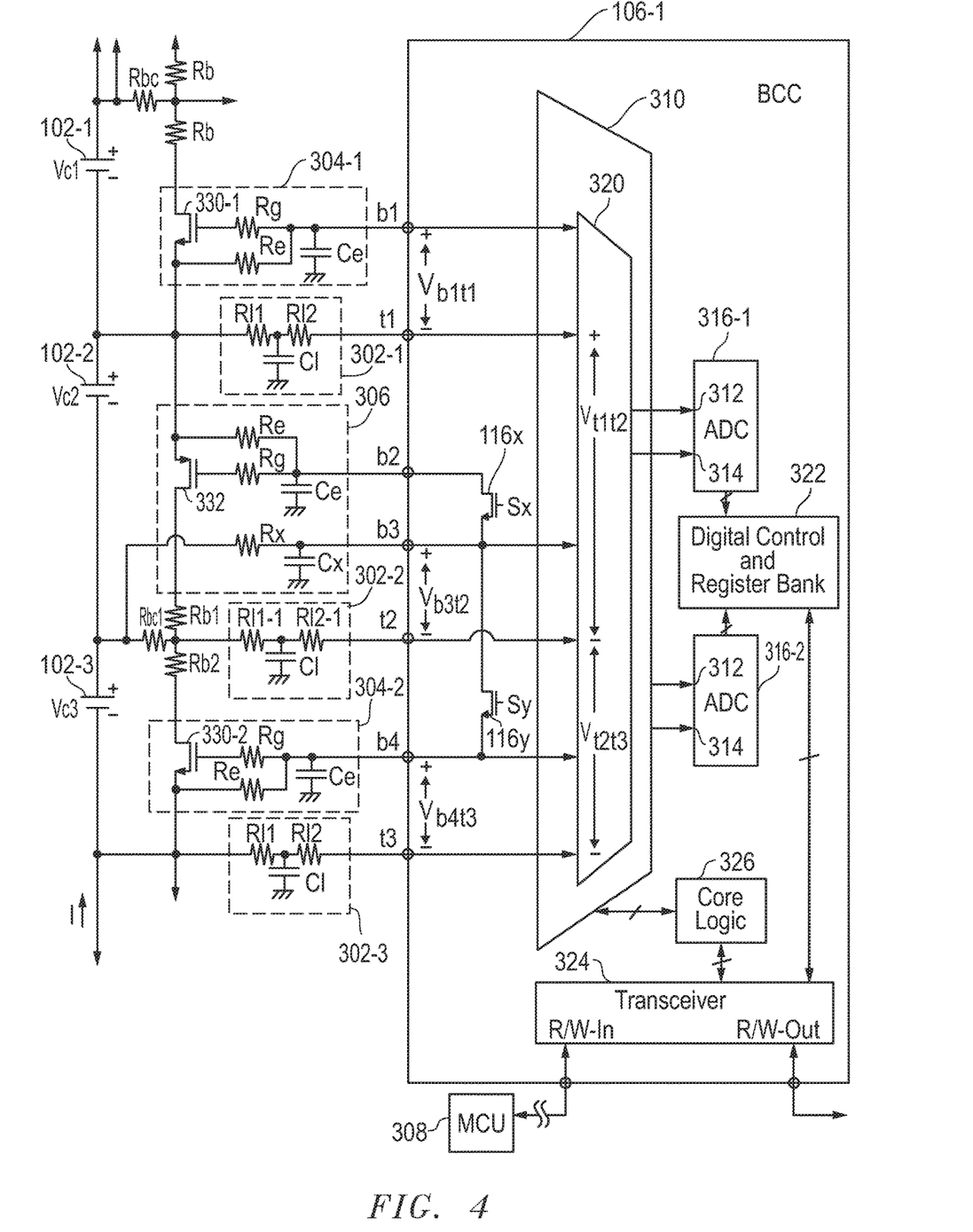
FIG. 4 is diagram of the battery pack shown in FIG. 3 with example embodiments of low-pass filters and cell balance circuits.

Each balance node b is coupled to a terminal of a battery cell 102. Some of the balance nodes b are coupled to a cell terminal via a balancing resistor Rb, while others are not. The ohmic value of balancing resistors Rb should be substantially less than that of cell resistors Rc. Balancing resistors Rb are selectively coupled together via MOSFETs 116 and dissipate energy during cell balancing. To illustrate, presume cell 102-1 requires balancing because MCU 112 determines $Vc_1$ is rising more rapidly than cell voltages of other cells during a recharging cycle. MOSFET 116-1 can be activated (e.g., turned on) in response to an assertion of control signal 51 by MCU 112. Activated MOSFET 116-1 transmits balancing current between the positive and negative terminals of cells 102-1 via balancing resistor Rb1 and connected balance nodes b1 and b2. This slows the charging of cell 102-1 while the other cells catch up. Although not shown in FIG. 1, pairs of connected cells 102 share a common balance node b so that only three balance nodes b are provided for pairs of cells 102. An example common balance node b is shown in FIG. 4, which is more fully described below.

As noted above BCCs 106 can measure battery cell voltages Vc by measuring the differential voltages Vtt. FIG. 1 illustrates differential voltage Vt1t2 between adjacent terminal nodes t1 and t2. Terminal input nodes t are designed to be high impedance. If no current flows into node t1, then no current flows through Rc1, and as a result Vt1t2=$Vc_1$. BCCs 106 convert voltages, such as differential Vt1t2 into digital equivalents for subsequent transmission to microcontroller 112. Microcontroller 112 processes the digital equivalents in accordance with instructions stored in memory in order to monitor cells 102 for unsafe conditions or for balancing purposes.

Because terminal nodes t should be high impedance, no current should flow into BCC 106 via terminal nodes t. Balance input nodes b are also designed to be high impedance when MOSFETs 116 are deactivated (i.e., turned off). Unfortunately, defective components internal or external to BCC 106 may create faults. And a fault can inadvertently create a conductive path between, for example, a voltage at a terminal node t and a lower voltage somewhere inside the BCC. The conductive path allows current (hereinafter, leakage current) to flow into the terminal t. More importantly the leakage current also flows through a cell input resistor Rc. The leakage current creates a DC voltage drop across Rc, which in turn creates a problem for accurate measurement of cell voltages Vc.

As noted BCC 106 indirectly measures cell voltage Vc by measuring the differential voltage Vtt at adjacent terminal nodes t. In the example above, BCC 106 measures the voltage $Vc_1$ across cell 102-1 by measuring the differential voltage Vt1t2 at input terminals t1 and t2. If no fault exists, then Vt1t2=$Vc_1$. But a leakage current can skew the measurement of a battery voltage Vc. To illustrate presume a fault causes leakage current I-leak to flow into t1 via cell input resistor Rc1. I-leak creates DC voltage drop Verror across Rc1, and as a result the voltage Vt1t2 measured by BCC 106-1 will not be an accurate representation of $Vc_1$. Rather, Vt1t2=$Vc_1$-Verror.

Continuing with the example fault, BCC transmits a digital representation of Vt1t2=$Vc_1$-Verror to MCU 112, and as a result MCU 112 will be given an inaccurate representation of $Vc_1$, the actual voltage across cell 102-1. Presume that $Vc_1$ exceeds a maximum allowed limit for safe operation of cell 102-1. In other words, cell 102-1 is overcharged. Presume also that Vt1t2=$Vc_1$-Verror falls below the maximum allowed limit. But for I-leak, MCU 112 would generate and send a command to open battery contactors to stop the flow of current I. But since Vt1t2=$Vc_1$-Verror is a below the maximum allowable voltage, MCU 112 does not issue the command Ultimately, MCU 112 will allow cell 102-1 to continue to be recharged in an unsafe condition.

To avoid problems like that mentioned above, MCU 112 should detect the existence of leakage currents. Unfortunately leakage currents, like I-leak, are difficult to detect. Some detection methods cannot detect leakage currents while battery cells are operating (i.e. being recharged or discharged). Other detection methods cannot detect leakage currents that are small. Noise is a primary reason that small leakage currents are difficult to detect. Loads (e.g., a DC-AC inverter) create substantial noise when they operate. Rapid changes of current I through the impedance in the cells 102, also creates substantial noise. The small DC error voltage caused by the leakage current is hidden under a dominating amount of noise, which is so large that the signal-to-noise ratio may be smaller than −45 dB. One goal of the present technology is to accurately detect small leakage currents while battery cells 102 are being charged or discharged.

FIG. 2 illustrates relevant components of a battery pack 200 with a BMS capable of detecting small leakage currents. Unfortunately, the BMS of FIG. 2 is less than a desirable solution to the problems noted above as will be more fully described below.

FIG. 2 shows a portion of battery pack 100 of FIG. 1 with low-pass filters 202 positioned between cells 102 and respective t and b input nodes. Essentially a low-pass filter operates by passing signals with frequency lower than a certain cutoff frequency $f_c$ and attenuating signals with frequencies higher than the cutoff frequency. Frequency $f_c$ depends on the filter design.

Low-pass filters exist in many different forms. Resistor-capacitor (RC) circuits work as low-pass filters. A first order, low pass RC filter is simply an RC series circuit across the input, with the output taken across the capacitor. The output of the low-pass RC filter is presumed to be connected only to high impedance. FIG. 2 shows filters 202 implemented as first order, low pass RC filters that include resistors Rf and capacitors Cf. The cutoff frequency $f_c$ for filters 202 is determined by its time constant τ, which is equal to the product of Rf (in ohms) and Cf capacitance (in farads) (i.e., τ=Rf·Cf). More particularly, $f_c=1/(2\pi\tau)=1/(2\pi Rf \cdot Cf)$.

Cutoff frequency $f_c$ is indirectly proportional to the time constant τ. A low cutoff frequency $f_c$ (e.g., 100 Hz) requires a large resistance Rf or a large capacitance Cf. Large capacitors occupy substantial area, are expensive, and thus impractical. It is for this reason is that filters with a low cutoff frequency $f_c$ are typically designed with large resistance. However, as will be more fully explained below, a large Rf presents problems with cell balancing.

Leakage current can create a DC voltage across resistors Rf and Rc. Voltages created by current leakage are hereinafter referred to as error voltages. An error voltage may be similarly created across resistors Rf and Rb due to DC leakage current into a balance terminal b. With frequency $f_c$ low enough, low-pass filters 202 remove most of the noise that would otherwise hide small error voltages caused by linkage currents. If an error voltage is present across resistors Rf and Rc1 or between resistors Rf and Rb1, a non-zero voltage voltage Vt1b1 will exist between input nodes t1 and b1 while MOSFET 116-1 is off. BCC 106 can measure voltages Vbt (hereinafter diagnostic differential voltages) at adjacent t and b input nodes, and subsequently report these voltages to MCU 112 for analysis. For example, BCC 106-1 can measure diagnostic voltage Vt1b1 across the input nodes t1 and b1 while MOSFET 116-1 is off. MCU 112 can compare the magnitude of Vt1b1 to a predetermined threshold. If the magnitude of Vt1b1 exceeds the predetermined threshold, an error voltage is presumed to exist across resistors Rf and Rc1 or across Rf and Rb1. MCU 112 can take appropriate action such as opening one or more battery contactors if the error voltage creates doubt that cell 102-1 is operating in a safe range.

If the cutoff frequency $f_c$ is low enough, low-pass filters 202 remove most of the noise that would otherwise hide small error voltages caused by linkage currents like I-leak. This makes diagnostic voltages Vbt very reliable indicators of problematic leakage current. But filters 202 must have a very low cutoff frequency $f_c$ to meet the goal of sufficiently removing enough noise to enable detection of the error voltage (e.g. Verror). Ideally the cutoff frequency $f_c$ should be 150 Hz or less. Filters 202 with $f_c$<100 Hz requires an Rf with very high impedance and/or a Cf with a very high capacitance. Capacitors Cf with large capacitance are expensive and occupy substantial area on an integrated circuit or board printed circuit board, especially if they must withstand high voltage, which is typically the case in BMS applications. From a practical standpoint filters 202 should be made with lower capacitance capacitors Cf and high ohmic resistors Rf. Unfortunately for those filters 202 contained within the passive cell balancing path, a large resistance Rf presents challenges. For example, a large resistance Rf limits the ability of BCC 106 to balance a battery cell. Also, current flow through a large Rf may generate substantial heat, and battery pack 200 be unable to dissipate the heat sufficiently enough to avoid shutdown by MCU 112.

Figure 3:
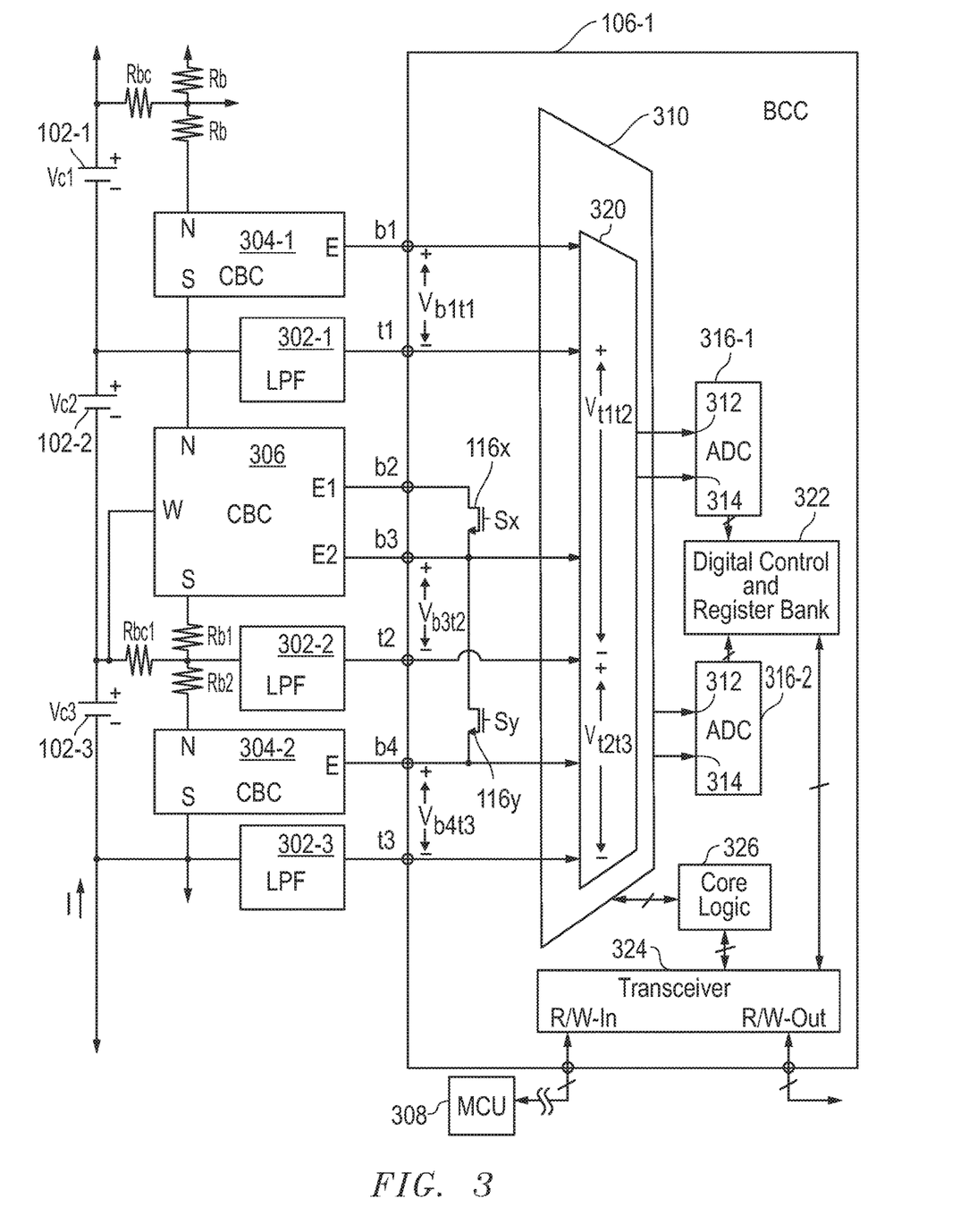
FIG. 3 is a diagram illustrating a battery pack employing one embodiment of the present technology.

The present technology addresses these problems and others and provides a method and apparatus for battery stack monitoring and balancing. The present technology can detect small error voltages while battery cells are being charged or discharged. FIG. 3 illustrates relevant components of a battery pack employing one embodiment of the present technology. FIG. 4 illustrates example embodiments of components shown in FIG. 3.

FIG. 3 illustrates the BCC 106-1 and battery cells 102-1-102-3 of FIGS. 1 and 2, along with low-pass filter circuits (LPF) 302, and cell balance control circuits (CBC) 304 and 306. For purposes of explanation only, just one CBC 306 is shown. However, it should be understood additional CBCs 306 can be employed. BCC 106-1 is in data communication with the MCU 308 via communication bus 110. MCU 308 functions much like MCU 112 as described with reference to FIG. 1. However, MCU 308 can perform additional functions.

FIG. 3 shows several internal components of BCC 106-1. As shown BCC 106-1 includes a structured multiplexor 310, which is indirectly controlled by MCU 308. Structured multiplexor 310 operates as a cross connect network in which any pair of inputs (e.g., t1 and t2) can be connected to the inputs of an analog-to-digital converters (ADC) 316. Structured multiplexor 310 may consist of simpler, structured multiplexers such as multiplexor 320, which are capable of connecting any pair of its inputs to respective inputs 312 and 314 of ADC 316-1. For example, multiplexor 320 can connect input nodes t1 and t2 to input nodes 312 and 314 of ADC 316-1. Or multiplexor 320 can connect input nodes b3 and t2 to input nodes 312 and 314 of ADC 316-1. A similar multiplexor 320 (not shown) can connect any pair of its inputs to respective inputs 312 and 314 of ADC 316-2.

Each ADC 316 converts a voltage between its inputs 312 and 314 into a digital equivalent. The outputs of ADCs 316 are provided to digital correction and register bank circuit 322. This device can hold the digital data it receives until they can be transmitted to MCU 308 for further processing via transceiver 324. MCU 308 monitors and manages cells 102 based on the data it receives from BCCs 106.

BCC 106-1 also includes a core logic module 326 that receives control values from MCU 308 via transceiver 324. BCC 106-1 operates according to these control values. For example, based on cell balancing control values it receives, core logic 326 can assert signals S that control MOSFETs 116 as will be more fully described below. Additionally, core logic 326 provides control inputs to multiplexors 320 for selecting balance b and terminal t input nodes for connection to ADCs 314.

CBCs 304 and 306 can balance battery cells 102. Signals S control MOSFETs 116, which in turn control CBCs 304 and 306. Importantly, current for balancing cells 102 flow through CBC 304 or CBC 306, not through MOSFETs 106. To illustrate, signal Sx, when asserted, activates MOSFET 116x, which in turn activates CBC 306. When activated CBC 306 creates a low resistance path (not shown) between its N and S terminals. Current for balancing cell 102-2 flows through the low resistance path of CBC 306 and balancing resistors Rb1 and Rbc1. CBCs 304 operate similarly. When activated CBC 304 creates a low resistance path (not shown) between its N and S terminals. For example, signal Sy, when asserted, activates MOSFET 116y, which in turn activates CBC 304-2. When activated CBC 304-2 creates a low resistance path between its N and S terminals. Current for balancing cell 102-3 flows through the low resistance path of CBC 304-2 and balancing resistors Rb2 and Rbc1. Balancing resistors Rb and Rbc have a very low ohmic values and do not substantially impede current during cell balancing. The conductive path between the N and S terminals of CBCs 304 and 306, are likewise very low in resistance, and as a result CBCs 304 and 306 do not substantially impede current during cell balancing.

LPFs 302, CBCs 304 and CBC 306 are connected between batteries 102 and BCC 106-1. LPFs 302 filter noise. In addition to balancing cells 102, CBCs 304 and 306 also filter noise. The combination of these filters remove noise that otherwise hides error voltages created by leakage currents.

With continuing reference to FIG. 3, FIG. 4 illustrates example embodiments of LPFs 302, CBCs 304 and CBC 306. LPFs 302 include low-pass resistors Rl1 and Rl2 coupled together between positive terminals of cells 102 and high impendence input terminals t. A capacitor C1 is connected at a point between these resistors and ground. If current leaks through an input terminal t because of a fault, a DC voltage error will be created across corresponding resistors Rl1 and Rl2.

Each CBC 304 includes an N channel MOSFET 330 that, when activated, transmits balancing current between terminals of a corresponding cell 102. One of ordinary skill in the art understands that the source-to-drain resistance of activated MOSFETs, including N channel MOSFETs 330, is very low. The source of each N channel MOSFET 330 is coupled to a negative terminal of a battery cell 102. The gate of each N channel MOSFET 330 is selectively coupled to a positive terminal of a battery cell 102 via a corresponding MOSFET 116. N channel MOSFET 330 can be activated for cell balancing by activating its corresponding MOSFET 116.

A resistor Re and a capacitor Ce are coupled as shown in CBCs 304 to create a low-pass filter between a corresponding terminal of battery 102 and a respective balancing input node b. The low-pass filter provided by the combination of resistor Re and capacitor Ce, attenuates noise created by, for example, rapidly changing current flow through the impedance of battery cells 102. The balancing input node b is presumed to be high impedance when the corresponding MOSFET 116 is off. However, a DC error voltage may be created across resistor Re if leakage current exists at balancing input node b.

Each CBC 306 is connected to a pair of immediately adjacent balance nodes b. For example, CBC 306 is connected to immediately adjacent balance nodes b2 and b3. Each CBC 306 includes a P channel MOSFET 332 that, when activated, transmits balancing current between terminals of a corresponding cell 102. The source of each P channel MOSFET 332 is coupled to a positive terminal of a battery cell 102. The gate of each P channel MOSFET 332 is selectively coupled to a negative terminal of a battery cell 102 via a corresponding MOSFET 116. P channel MOSFET 332 can be activated for cell balancing by activating its corresponding MOSFET 116.

CBC 306 includes two low pass filters. The first low-pass filter is created by the combination of resistor Rx and capacitor Cx, which are coupled as shown between the positive terminal of a corresponding battery cell 102 and a first (e.g., b2) of the two immediately adjacent balance nodes b to which CBC 306 is connected. The second low-pass filter is created by the combination of resistor Re and capacitor Ce coupled as shown between the negative terminal of the corresponding battery cell 102 and a second (e.g., b3) of the two immediately adjacent balance nodes b to which CBC 306 is connected. The first and second low-pass filters block higher frequency noise from reaching their respective balance nodes b, each of which is presumed to be high impedance when the corresponding MOSFET 116 is off. However, a DC error voltage may be created across resistor Re if leakage current flows exists at the balancing input node b to which Re is connected, or a DC error voltage may be created across resistor Rx if leakage current exists at the balancing input node b to which Rx is connected, or a DC error voltage may be created across resistor Rbc if leakage current flows through MOSFET 332 while off. These error voltages can manifest themselves in non-zero diagnostic voltages Vbt. Other error voltages are contemplated and can also be detected as non-zero diagnostic voltages Vbt.

BCC 106 can provide MCU 308 with digital representations of voltages between balance b and terminal t input nodes. For example, BCC 106-1 can provide MCU 308 with digital representations of voltages between: nodes b1 and t1; nodes b3 and t2; nodes b4 and t3; nodes t1 and t2, and/or nodes t2 and t3. MCU 308 includes a non-transitory memory (e.g., flash memory) and a central processing unit (CPU) that processes voltages provided by BCCs 106 in accordance with instructions stored in the non-transitory memory. A computer system external to the pack can transmit the instructions to MCU 308 for storage in the non-transitory memory via a data communication link such as the Internet.

MCU 308 processes voltages it receives from BCCs 106 in response to executing instructions stored in its non-transitory memory. To illustrate BCC 106-1 can report cell voltages Vc to MCU 308 by measuring the differential voltages Vtt between input nodes t coupled to cells 102. Lacking any fault that creates a leakage current, differential voltages Vtt will accurately represent respective cell voltages Vc. MCU 308 can compare the magnitudes of differential voltages Vtt it receives against a minimum allowable voltage and a maximum allowable voltage. If a differential voltage Vtt magnitude is found to be outside the range of acceptable voltages, MCU 308 can take appropriate action. For example, if MCU 308 determines that differential voltage Vt1$t$2 exceeds the maximum allowable voltage, MCU 308 can open battery contactors.

Error voltages are created by leakage current. Error voltages can lead to inaccurate measurements of cell voltages Vc. MCU 308 can detect leakage current by monitoring diagnostic voltages Vbt between b and t nodes. For example, a non-zero diagnostic voltage Vb4$t$3 may exist between input nodes b4 and t3 as a result of leakage current flow through Re of CBC 304-2 or through the combination of Rl1 and Rl2 of LPF 302-3. Or a non-zero diagnostic voltage Vb3$t$2 may exist between input nodes b3 and t2 as a result of leakage current flowing through Rx, Rbc1, or the combination of Rl1-1 and Rl2-1 of LPF 302-2. MCU 308 can request diagnostic voltages Vbt, including Vb4$t$3 and Vb3$t$2 from BCCs 106. MCU 308 can compare the magnitude of diagnostic voltages Vbt with predetermined values. If the magnitude of a diagnostic voltage Vbt exceeds the predetermined value, MCU 308 may conclude a potentially dangerous current leak exists and appropriate corrective action should be taken. To illustrate, MCU 308 may determine that a non-zero diagnostic voltage Vb3$t$2 exceeds the predetermined value, which may imply an error voltage exists across Rx, Rbc1, or the combination of Rl1-1 and Rl2-1 of LPF 302-2, which in turn implies that MCU 308 is not receiving an accurate measurement of Vc$_2$ via Vt1$t$2 or an accurate measurement of Vc$_3$ via Vt2$t$3. Not having an accurate measurement of cell voltage Vc can lead to dangerous situation as mentioned above. A non-zero diagnostic voltage Vb3$t$2 could also imply an error voltage exists across resistor Rbc1, which in turn implies that current is leaking through inactive MOSFET 332, which may be another dangerous situation. Ultimately MCU 308 can take corrective action such as opening battery contactors as a safety measure in response to determining the magnitude of a diagnostic voltage exceeds the predetermined value Importantly, diagnostic voltages Vbt are not dependent upon voltages Vc. Thus MCU 308 need not consider Vc when monitoring diagnostic voltages Vbt.

Table 1 below illustrates example values for capacitors and resistors in FIG. 4. Using these capacitors and resistors the BMS shown in FIG. 4 is more than capable of accurately detecting small DC error voltages.

TABLE 1

| ID | Value | Units |
| --- | --- | --- |
| Rl1 | 3 | kΩ |
| Cl1 | 470 | 1 nF |
| Rl2 | 2 | kΩ |
| Rb | 39 | Ω |
| Rbc | 5.11 | Ω |
| Re | 43 | kΩ |
| Ce | 33 | nF |
| Rg | 27 | kΩ |
| Rx | 3 | kΩ |
| Cx | 470 | nF |

As noted in this table cell balancing resistors Rb and Rbc present very limited resistance to balancing current. The source-to-drain resistance of activated MOSFETS 330 or 332 is also very low. The filters employed in FIG. 4, including those in the CBCs, remove noise that otherwise would hide a DC error voltage created by leakage current. This allows error voltages to be detected by MCU 112. The filters present in the CBCs employ relatively small capacitors and relatively large resistors as seen in the table above.

This description uses the terms "connected" and "coupled." The term coupled is broader than the term connected. The term connected means a direct connection between devices such as transistors. In other words, there is no device intervening between two connected devices, other than parasitic capacitance, inductance, and/or resistance between the devices. In contrast, two devices can be "coupled" together either directly (i.e., connected), or indirectly via an intervening device.

A battery stack monitoring and balancing circuit is disclosed. In a first embodiment, a first low-pass filter (LPF) is coupled between a first terminal and a first input node of a circuit that includes a plurality of input nodes. The first terminal can be coupled to a positive terminal of a battery cell. A second LPF is coupled between the first terminal and a second input node of the circuit. A first circuit is coupled between the first terminal and a second terminal. The first circuit is configured to transmit current between the first and second terminals when activated. The second terminal can be coupled to a negative terminal of the battery cell. A second circuit is coupled between the second and third input nodes. The second circuit can activate the first circuit in response to the second circuit receiving a control signal.

The first embodiment may also include a third LPF coupled between a third input node of the circuit and the second terminal, and a fourth LPF coupled between a fourth input node of the circuit and the second terminal.

The circuit of the first embodiment may include an analog-to-digital converter (ADC) having a pair of input nodes, and a switching circuit having a pair output nodes coupled to the pair of input nodes of ADC. The switching circuit can selectively couple two input nodes of the circuit to the pair of input nodes of the ADC, respectively, via the pair of output nodes, respectively. The ADC circuit can convert a voltage between its pair of input nodes into a digital equivalent for subsequent transmission to and processing by a device external to the circuit.

A third circuit can be coupled between the second terminal and a third terminal. The third circuit can transmit current between the second and third terminals when activated. The third terminal can be coupled to a negative terminal of another battery cell. A fourth circuit can be coupled to the third input, and the second circuit can activate the third circuit in response to the fourth circuit receiving another control signal.

A data processing device may be included and configured to compare a predetermined value to a digital representation of a voltage between the first and second input nodes. The data processing device can generate a command in response to determining the predetermined value exceeds the digital representation.

The first circuit includes a P-channel MOSFET coupled between the first and second terminals, and the second circuit includes a N-channel MOSFET coupled between the first and second input nodes.

The third circuit includes a N-channel MOSFET coupled between the second and third terminals of the battery cell. The fourth circuit includes a N-channel MOSFET coupled to the third input node.

A balancing resistor may be coupled between the first terminal and the first circuit. Each of the first and second LPFs includes a resistor and a capacitor. The resistance of the balancing resistor is less than a resistance of the LPF resistors.

In a second embodiment, first and second terminals can be coupled to positive and negative terminals, respectively, of a first battery cell within a stack of battery cells. A third terminal can be coupled to a negative terminal of a second battery cell within the stack of battery cells. A first circuit is coupled between the first and second terminals and can transmit current for balancing the first battery cell when the first circuit is activated. A second circuit is coupled between the second terminal and the third terminal and can transmit current for balancing the second battery cell when the second circuit is activated. A first MOSFET can activate the first circuit when the first MOSFET is activated. A second MOSFET can activate the second circuit when the second MOSFET is activated.

The second embodiment may include a first low pass filter coupled between the first terminal and a first input node of a circuit, and a second low pass filter coupled between the first terminal and a second input node of the circuit.

A data processing device is included and can compare a first predetermined value to a digital representation of a voltage between the first and second input nodes. The data processing device can generate a command in response to determining the first predetermined value exceeds the digital representation.

A third low pass filter is coupled between the second terminal and a third input node of a circuit, and a fourth low pass filter is coupled between the second terminal and a fourth input node of the circuit.

A data processing device is included and can compare a second predetermined value to a digital representation of a voltage between the first and fourth input nodes. The the data processing device can generate another command in response to determining the second predetermined value exceeds the digital representation of the voltage between the first and fourth input nodes.

The circuit may include an analog-to-digital converter (ADC) with a pair of input nodes, and a switching circuit with a pair output nodes coupled to the pair of input nodes of ADC. The switching circuit can selectively couple two input nodes of the circuit to the pair of input nodes of the ADC, respectively, via the pair of output nodes, respectively. The ADC circuit can convert a voltage between its pair of input nodes into a digital equivalent for subsequent transmission to and processing by the data processing device.

A method is also disclosed in which a first predetermined value is compared to digital representation of a first analog voltage that exists between first and second input nodes of a circuit. A command is generated if the digital representation exceeds the predetermined value. The first input node is coupled to a first terminal of a battery cell via a first low pass filter (LPF). The second input is coupled to the first terminal of the battery cell via a second LPF.

The method may further include comparing the first predetermined value to digital representation of a second analog voltage that exists between third and fourth input nodes of the circuit. A command is generated if the digital representation exceeds the predetermined value. The third input node is coupled to a second terminal of the battery cell via a third low pass filter (LPF). The fourth input is coupled to the second terminal of the battery cell via a fourth LPF.

The method may further include comparing a second predetermined value to digital representation of a third analog voltage that exists between first and fourth input nodes of the circuit, and generating another command if the digital representation of the third analog voltage exceeds the second predetermined value.

The method may further include a first circuit transmitting current between the first and second terminals of the battery cell in response to the generation of the other command.

The comparing can be implemented by a data processing device in response to executing computer readable instructions stored in memory thereof.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
a first low-pass filter (LPF) coupled between a first terminal and a first input node of a circuit that comprises a plurality of input nodes, wherein the first terminal is configured to be coupled to a positive terminal of a battery cell;
a second LPF coupled between the first terminal and a second input node of the circuit;
a first circuit coupled between the first terminal and a second terminal, wherein the first circuit is configured to transmit current between the first and second terminals when activated, and wherein the second terminal is configured to be coupled to a negative terminal of the battery cell;
a second circuit coupled between the second and third input nodes, wherein the second circuit is configured to activate the first circuit in response to the second circuit receiving a control signal.

2. The apparatus of claim 1 further comprising:
a third LPF coupled between a third input node of the circuit and the second terminal;
a fourth LPF coupled between a fourth input node of the circuit and the second terminal.

3. The apparatus of claim 2 wherein the circuit comprises:
an analog-to-digital converter (ADC) comprising a pair of input nodes;
a switching circuit comprising a pair output nodes coupled to the pair of input nodes of ADC;
wherein the switching circuit is configured to selectively couple two input nodes of the circuit to the pair of input nodes of the ADC, respectively, via the pair of output nodes, respectively;
wherein the ADC circuit is configured to convert a voltage between its pair of input nodes into a digital equivalent for subsequent transmission to and processing by a device external to the circuit.

4. The apparatus of claim 2 further comprising:
a third circuit coupled between the second terminal and a third terminal, wherein third circuit is configured to transmit current between the second and third terminals when activated, wherein the third terminal is configured to be coupled to a negative terminal of another battery cell;
a fourth circuit coupled to the third input, wherein the second circuit is configured to activate the third circuit in response to the fourth circuit receiving another control signal.

5. The apparatus of claim 1 further comprising:
a data processing device configured to compare a predetermined value to a digital representation of a voltage between the first and second input nodes;
wherein the data processing device is configured to generate a command in response to determining the predetermined value exceeds the digital representation.

6. The apparatus of claim 2 further comprising:
a data processing device configured to compare a predetermined value to a digital representation of a voltage between the third and fourth input nodes;
wherein the data processing device is configured to generate a command in response to determining the predetermined value exceeds the digital representation.

7. The apparatus of claim 1:
wherein the first circuit comprises a P-channel MOSFET coupled between the first and second terminals;
wherein the second circuit comprises a N-channel MOSFET coupled between the first and second input nodes.

8. The apparatus of claim 4:
wherein the third circuit comprises a N-channel MOSFET coupled between the second and third terminals of the battery cell;
wherein the fourth circuit comprises a N-channel MOSFET coupled to the third input node.

9. The apparatus of claim 1 further comprising:
a balancing resistor coupled between the first terminal and the first circuit;
wherein each of the first and second LPFs comprise a resistor and a capacitor;
wherein resistance of the balancing resistor is less than a resistance of the LPF resistors.

* * * * *